(12) United States Patent
Stamatakis (10) Patent No.: US 9,876,653 B1
(45) Date of Patent: Jan. 23, 2018

(54) SYSTEM, METHOD AND APPARATUS FOR AUGMENTING A BUILDING CONTROL SYSTEM DOMAIN

(71) Applicant: Senseware, Inc., McLean, VA (US)

(72) Inventor: Julien G. Stamatakis, Centreville, VA (US)

(73) Assignee: Senseware, Inc., Tysons, VA (US)

( * ) Notice: Subject to any disclaimer, the term of this patent is extended or adjusted under 35 U.S.C. 154(b) by 147 days.

(21) Appl. No.: 14/871,014

(22) Filed: Sep. 30, 2015

Related U.S. Application Data

(63) Continuation-in-part of application No. 14/710,170, filed on May 12, 2015, now Pat. No. 9,551,594.

(60) Provisional application No. 62/136,959, filed on Mar. 23, 2015, provisional application No. 61/992,307, filed on May 13, 2014.

(51) Int. Cl.
*H04L 12/28* (2006.01)
*G05B 15/02* (2006.01)

(52) U.S. Cl.
CPC .......... *H04L 12/2834* (2013.01); *G05B 15/02* (2013.01); *H04L 12/281* (2013.01); *H04L 2012/2841* (2013.01)

(58) Field of Classification Search
CPC ....... G01D 4/002; G01D 4/006; H04W 84/18; H04W 4/005; H04W 4/008; G06F 3/0482; G06F 3/04842; G08C 19/00
See application file for complete search history.

(56) References Cited

U.S. PATENT DOCUMENTS

| | | | |
|---|---|---|---|
| 6,584,113 B1 | 6/2003 | Manduley | |
| 7,191,097 B1 | 3/2007 | Lee | |
| 7,379,981 B2 | 5/2008 | Elliott et al. | |
| 8,103,389 B2 | 1/2012 | Golden et al. | |
| 8,339,069 B2 | 12/2012 | Chemel | |
| 8,527,096 B2 | 9/2013 | Pavlak | |
| 8,527,626 B1 | 9/2013 | Wang | |
| 8,548,630 B2 | 10/2013 | Grohman | |
| 8,855,825 B2 | 10/2014 | Grohman | |
| 8,892,797 B2 | 11/2014 | Grohman | |
| 9,715,239 B2 | 7/2017 | Fadell | |
| 2002/0173704 A1 | 11/2002 | Schulze | |
| 2005/0054289 A1 | 3/2005 | Salazar | |
| 2006/0077607 A1 | 4/2006 | Henricks | |
| 2007/0211681 A1 | 9/2007 | Sun et al. | |

(Continued)

FOREIGN PATENT DOCUMENTS

CN 103687076 A * 3/2014

OTHER PUBLICATIONS

Application Note: ModHopper Makes Submetering Easy, Obvius, LLC, Mar. 29, 2012.*

(Continued)

*Primary Examiner* — Charles C Jiang
*Assistant Examiner* — Kyaw Z Soe (57) ABSTRACT

A system, method and apparatus for augmenting a building control system domain. A sensor network platform can be configured to collect data based on measurements from sensors outside of a legacy building control system domain, and to present information based on the collected data to a known interface supported by the legacy building control system. In one embodiment, the collected data can undergo customized processing by an operation center outside of the legacy building control system domain.

20 Claims, 9 Drawing Sheets

(56) References Cited

U.S. PATENT DOCUMENTS

| | | | |
|---|---|---|---|
| 2007/0225954 A1 | 9/2007 | Kodesky | |
| 2008/0195757 A1 | 8/2008 | Kim | |
| 2008/0240105 A1 | 10/2008 | Abdallah | |
| 2009/0033513 A1 | 2/2009 | Salsbury | |
| 2010/0011340 A1 | 1/2010 | Pandey | |
| 2010/0083356 A1 | 4/2010 | Steckley | |
| 2010/0141153 A1 | 6/2010 | Recker | |
| 2010/0231386 A1 | 9/2010 | Barnes | |
| 2010/0327766 A1 | 12/2010 | Recker | |
| 2011/0034120 A1 | 2/2011 | Jaiyeola | |
| 2011/0040809 A1 | 2/2011 | Spanier | |
| 2011/0131320 A1 | 6/2011 | Hong | |
| 2011/0157366 A1* | 6/2011 | Padmanabh | H04N 7/15 348/159 |
| 2011/0248857 A1 | 10/2011 | Rutherford | |
| 2011/0255454 A1 | 10/2011 | Hauser | |
| 2011/0276738 A1 | 11/2011 | Kim | |
| 2012/0098445 A1 | 4/2012 | Park | |
| 2012/0203508 A1 | 8/2012 | Hamzaoui | |
| 2012/0269199 A1* | 10/2012 | Chan | G01D 4/004 370/401 |
| 2012/0310599 A1 | 12/2012 | Tanaka | |
| 2013/0086195 A1 | 4/2013 | Hiniker | |
| 2014/0085102 A1 | 3/2014 | McCormick | |
| 2014/0126581 A1 | 5/2014 | Wang | |
| 2014/0207290 A1 | 7/2014 | Crawford | |
| 2014/0293993 A1 | 10/2014 | Ryhorchuk | |
| 2014/0334653 A1 | 11/2014 | Luna | |
| 2014/0359133 A1 | 12/2014 | Tian | |
| 2015/0021988 A1 | 1/2015 | Barnetson | |
| 2015/0043411 A1 | 2/2015 | Kim | |
| 2015/0097961 A1 | 4/2015 | Ure | |
| 2015/0106447 A1 | 4/2015 | Hague | |
| 2015/0156286 A1 | 6/2015 | Blair | |
| 2015/0316945 A1 | 11/2015 | Soya | |
| 2016/0006264 A1 | 1/2016 | Alperin | |
| 2016/0019763 A1 | 1/2016 | Raji | |
| 2016/0112518 A1 | 4/2016 | Haleem et al. | |
| 2016/0193895 A1 | 7/2016 | Aich | |
| 2016/0195856 A1 | 7/2016 | Spero | |
| 2017/0048376 A1 | 2/2017 | Logan | |

OTHER PUBLICATIONS

First Action Interview Pilot Program Pre-Interview Communication, U.S. Appl. No. 14/862,280, dated Mar. 8, 2017.
First Action Interview Pilot Program Pre-Interview Communication, U.S. Appl. No. 14/926,089, dated Jun. 19, 2017.
First Action Interview Pilot Program Pre-Interview Communication, U.S. Appl. No. 14/926,118, dated Jul. 11, 2017.
Office Action, U.S. Appl. No. 15/264,697, dated Jul. 21, 2017.
Office Action, U.S. Appl. No. 15/389,626, dated Jul. 14, 2017.
First Action Interview Pilot Program Pre-Interview Communication, U.S. Appl. No. 14/710,209, dated Oct. 25, 2016.
Press Release, Helium Makes Sense of the Internet of Things, Oct. 27, 2015.
Press Release, Helium Introduces Another Smart Sensor for Environmental Monitoring, Apr. 25, 2016.
Press Release, Helium Announces Helium Pulse Monitoring and Alerting Application, Apr. 25, 2016.
EE Times, IoT Startup Revises 802.15.4 Nets, Oct. 27, 2015.
Helium Pulse™ for Monitoring and Alerting, 2016.
Helium Green™ Environmental Smart Sensor, 2016.
Helium Blue™ Temperature & Door Smart Sensor, 2016.
Cloud Logger, 38 Zeros, 2015.
Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.
Manning, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.
$3^{rd}$ Generation Nest Learning Thermostat, 2015.
AcquiSuite+ Dtaa Acquisition Server, Obvius, LLC, Installation and Operation Manual, Model A8814, Jan. 11, 2014.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxture solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.
SmartStruxture Lite Solution, Our open system approach to standards and protocols, Schneider Electric, Jul. 2, 2014.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, SpinWave Systems, Inc., 2007.
Veris Industries, 2015.
U.S. Appl. No. 62/025,640, entitled "Separation of Current Sensor and Voltage Sensor for True Power Measurement," filed Jul. 17, 2014.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.
DOLPHIN Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.
Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™—Balancing Efficiency with Comfort, Automated Logic Corporation, 2013.
Equipment Portal, Automated Logic Corporation, 2013.
EnergyReports™ Web Application—A Tool for Sustainable Building Operations, Automated Logic Corporation, 2013.
WebCTRL®—Powerful and Intuitive Front End for Building Control, Mar. 26, 2015.
EnergyReports™Web Application—A Tool for Sustainable Building Operations, Automated Logic Corporation, 2013.
iSelect Adds New Portfolio Company: Bractlet, 2015.

(56) References Cited

OTHER PUBLICATIONS

Know—Bractlet.
Analyze—Bractlet.
Ensure—Bractlet.
Announcing Samsara: Internet connected sensors, May 18, 2015.
Samsara—Internet Connected Sensors.
Samsara—Features.
Samsara—Models.
Samsara—API.
Office Action, U.S. Appl. No. 14/710,170, dated Jul. 19, 2016.
Office Action, U.S. Appl. No. 15/145,871, dated Sep. 30, 2016.
Office Action, U.S. Appl. No. 13/344,667, dated Sep. 26, 2017.
Office Action, U.S. Appl. No. 14/926,118, dated Oct. 4, 2017.
Office Action, U.S. Appl. No. 14/926,089, dated Nov. 13, 2017.

\* cited by examiner

SYSTEM, METHOD AND APPARATUS FOR AUGMENTING A BUILDING CONTROL SYSTEM DOMAIN

This application is a continuation-in-part of non-provisional application Ser. No. 14/710,170, filed May 12, 2015. Non-provisional application Ser. No. 14/710,170 claims the benefit of and priority to provisional application No. 61/992,307, filed May 13, 2014, and to provisional application No. 62/136,959, filed Mar. 23, 2015. Each of the above-identified applications is incorporated herein by reference in its entirety.

BACKGROUND

Field

The present disclosure relates generally to sensor applications, including a system, method and apparatus for augmenting a building control system domain.

Introduction

Sensors can be used to monitor various conditions at a monitored location such as a building. In one example, sensors can be used to monitor physical environment conditions such as temperature, humidity, and air quality. In another example, sensors can be used to monitor physical environment conditions such as consumption of a particular utility (e.g., power). The application of sensors within the building context is growing as the utility provided by such monitoring expands.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

A Building Management System (BMS) is an example of a computer-based control system installed in a building. In general, the computer-based control system can monitor and control some aspect of a building's functionality. The BMS, for example, can be designed to monitor and control the building's mechanical and electrical equipment such as ventilation, lighting, power systems, fire systems, and security systems. Other examples of computer-based control systems installed in a building include a Building Automation System (BAS), a Facility Management Systems (FMS), an Energy Management Systems (EMS), a Maintenance Management System (MMS), or any other control system installed in a building that can leverage input information based on sensor measurements.

A BMS is a combination of hardware and software and is typically proprietary. A BMS can be installed during the building construction phase as it is tied in with the installation of extensive mechanical, HVAC, electrical, and plumbing systems. Due in part to its scale of operation, the BMS is often rigidly configured or incomplete in its reach. This results because the BMS is not installed with the sufficient level of granularity to enable fine-tuning of its operation to meet the particular needs of a building site. Further problematic is the prohibitive expense of adjusting or modifying the proprietary BMS. In general, the BMS is typically inflexible in adapting to the dynamic nature of the on-site needs as the building usage evolves over time. This can be especially true when considering the need for increasing the number of sensors at a building site to give the BMS additional information to implement control measures with greater accuracy and effectiveness.

In the present disclosure, it is recognized that a sensor network platform can be used to augment the sensor information that is input into a building control system such as a BMS. In one example system, a gateway device is installed at a monitored location with a network connection with an operations center located external to the monitored location. The gateway device can communicate with a plurality of sensor network nodes, wherein each sensor network node can support one or more sensors. In one embodiment, the sensor network platform can perform customized processing of sensor data collected at the monitored location to produce the particular sensor information desired by the building control system.

Figure 1:
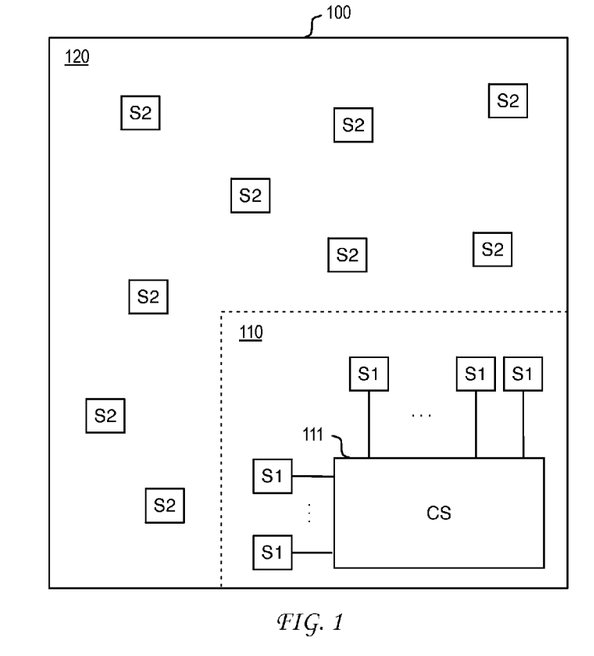
FIG. 1 illustrates an example of a monitored location.

FIG. 1 illustrates an example of a monitored location. In general, a monitored location can represent any area where one or more sensors are deployed. The monitored location may or may not represent a physical area having clearly defined boundaries. As would be appreciated, the extent of the monitoring application itself provides a sense of boundary to the monitored location. In one example, the monitored location can represent a building such as a home, hotel, industrial facility, school, hospital, community building, stadium, airport, convention center, warehouse, office building, mall, shopping center, data center, multi-dwelling unit, or other defined building structure. In another example, the monitored location can represent an area of control such as a vehicle or container in any mode of transport, an asset collection area, a construction zone, or any monitored area that can be fixed or movable. In yet another example, the monitored location can represent an area proximate to an article, device, person or other item of interest upon which one or more sensors are attached.

In the example of FIG. 1, monitored location 100 includes control system 111. Where monitored location 100 includes a building, control system 111 can represent a building control system such as a BMS. Control system 111 operates in a domain 110. Domain 110 need not represent a defined physical area. Rather, domain 110 can represent a logical expression of the reach of control system 111 as defined by a first plurality of sensors (S1) that are equipped to provide sensor data to control system 111. As would be appreciated, the first plurality of sensors can be connected to control system 111 via a known interface mechanism supported by control system 111.

As illustrated in FIG. 1, monitored location 100 also includes a second domain 120 that can represent a logical expression of a domain outside the reach of control system 111. Included within the second domain 120 is a second plurality of sensors (S2) that are not currently integrated with control system 111. This lack of integration can result from the inflexibility of control system 111 in adapting to the changing sensor application needs within monitored location 100. In the example of a BMS, the changing sensor application needs can represent the addition of new sensors in a building that respond to new government regulations, that respond to sensor needs in new locations, that respond to new tenant requirements, that incorporate new sensor technology, that incorporate new sensor interfaces, or that achieves any new sensor objective that is beyond the scope of the BMS as initially installed or currently operated. As noted, BMS installations can be inflexible and require significant expense to modify or otherwise adjust its operation. This significant expense will often preclude the integration of the second plurality of sensors with control system 111. As a result, the second plurality of sensors can operate in a second sensor network that is independent of domain 110. This independence limits the utility of control system 111 and reduces the overall return on the original investment in control system 111.

Figure 2:
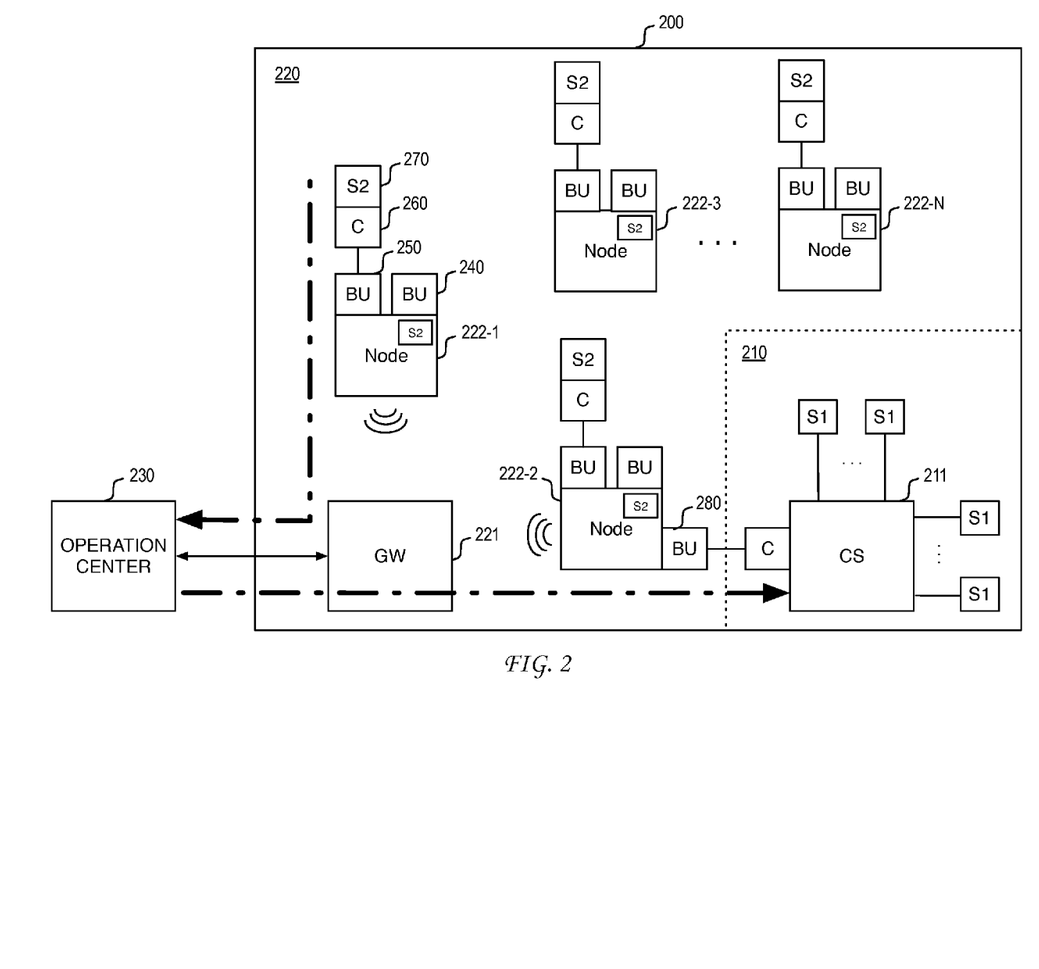
FIG. 2 illustrates an example embodiment of augmenting a control system domain.

FIG. 2 illustrates an example embodiment of a system for augmenting a domain of a legacy control system. As illustrated, monitored location 200 includes legacy control system 211. Legacy control system 211 operates in a domain 210, which can represent a logical expression of the reach of legacy control system 211. Monitored location 200 also includes a second domain 120 that can represent a logical expression of a domain outside the reach of legacy control system 211. Included within the second domain 220 is a second plurality of sensors (S2) that are not integrated with legacy control system 211. As noted above, the lack of integration of the second plurality of sensors can be due to a number of reasons that relate to new sensor objectives that are beyond the scope of the legacy control system 211 as initially installed or currently operated. In the present disclosure, it is recognized that a sensor network platform can be configured to collect data based on measurements from non-integrated sensors in second domain 220, and to present information based on the collected data to a known interface supported by legacy control system 211.

As illustrated in FIG. 2, a plurality of sensor network nodes 222-n can support the non-integrated second plurality of sensors in second domain 220. Sensor network nodes 222-n can communicate with gateway 221 via wired or wireless communication. In turn, gateway 221 can communicate with operation center 230 via a network connection. This network connection can be embodied in various forms depending upon the particular characteristics of monitored location 200. For example, where monitored location 200 is a building in a developed area, then the network connection can be facilitated by a wired Internet connection via an Internet service provider (ISP). Where monitored location 200 is a remote physical area (or movable area) that may include a building structure, then the network connection can be facilitated by a terrestrial or satellite based wireless network. Here, it should be noted that multiple gateways can be used at a particular monitored location, wherein each gateway supports a different set of sensors and has a separate network connection to an operation center.

To illustrate the various ways that a sensor network node can support one or more of the second plurality of sensors, consider the example of sensor network node 222-1. First, one or more of the second plurality of sensors (S2) can be integrated with sensor network node 222-1. Second, one or more of the second plurality of sensors can be supported by bridge unit (BU) 240, which is configured for attachment to sensor network node 222-1. Third, one or more of the second plurality of sensors can be supported by bridge unit 250, which communicates with an external controller (C) 260 connected to one or more of the second plurality of sensors. To illustrate the various ways that sensor network node 222-1 can support one or more of the second plurality of sensors, reference is now made to FIG. 3, which illustrates an example embodiment of a sensor network node that can provide varied support for one or more of the second plurality of sensors.

Figure 3:
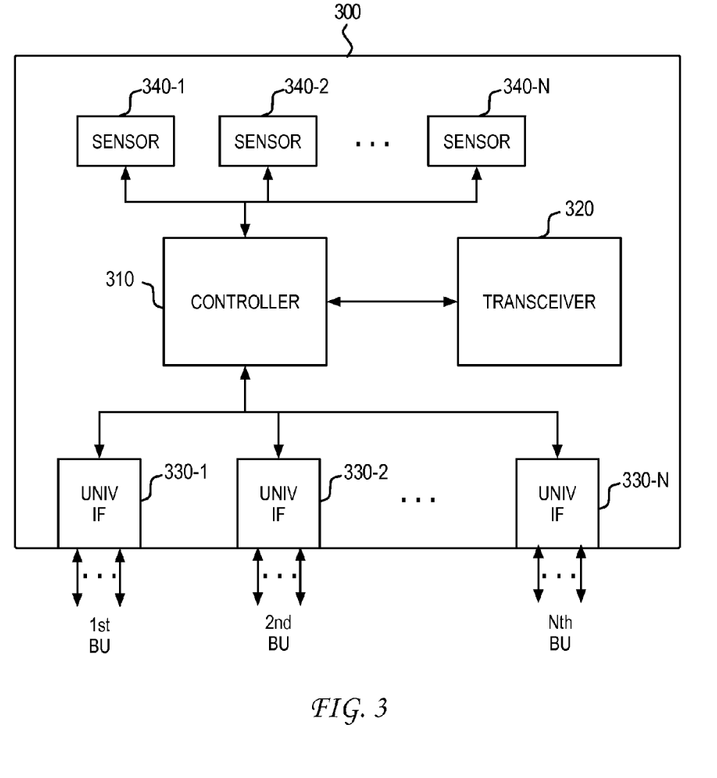
FIG. 3 illustrates an example embodiment of a node in a sensor network.

As illustrated, sensor network node 300 includes controller 310 and transceiver 320, which can support wired or wireless communication. The use of wireless communication enables sensor network node 300 to collect data from sensors that are installed at locations remote from the network infrastructure used by the control system. In one embodiment, a plurality of sensor network nodes can form a wireless mesh network using the IEEE 802.15.4 protocol. This wireless mesh network enables sensor network node 300 to communicate with a gateway or another sensor network node that operates as a relay between sensor network node 300 and the gateway. Where wired communication is supported, sensor network node 300 can be configured to communicate with another sensor network node, a gateway or an operation center.

As illustrated, controller 310 can collect data based on measurements by a plurality of sensors 340-$n$ that are contained within or otherwise supported by a housing of sensor network node 300. In one embodiment, the plurality of sensors 340-$n$ integrated with sensor network node 300 can include a temperature sensor, a humidity sensor, an air quality (e.g., $CO_2$) sensor, a light sensor, a sound sensor, or any other sensor that can be integrated with sensor network node 300. In general, the plurality of sensors 340-$n$ can facilitate monitoring of the physical environment at that part of the monitored location, including the health and/or status of sensor network node 300.

As noted, a sensor network node can also collect sensor measurements from one or more sensors via bridge units. As illustrated in FIG. 3, controller 310 can collect data from a set of bridge units that are connected to sensor network node 300 via one or more universal sensor interfaces 330-$n$. Each universal sensor interface 330-$n$ can support the connection of sensor network node 300 with a separate bridge unit. The plug-and-play universal sensor interface facilitates the separation of the sensor network node communication infrastructure from the set of one or more bridge units that are deployed at the location at which the supporting sensor network node is installed. This separation creates significant flexibility in providing customized sensor application solutions after installation of the control system.

Universal sensor interfaces 330-n can represent a combination of hardware and software. The hardware portion of universal sensor interfaces 330-n can include a wired interface that enables communication of different signals between sensor network node 300 and a connected bridge unit. In one example, the wired interface can be enabled through a connector interface, which is exposed by the housing of sensor network node 300, and that is configured to receive a bridge unit connector via removable, pluggable insertion.

In one embodiment, the wired interface can be based on a Serial Peripheral Interface (SPI) bus. In one example, the wired interface enables six connections: supply, ground, data in, data out, clock, and device select. The device select connection can be unique to each wired interface and can enable controller 310 in sensor network node 300 to select the particular bridge unit with which sensor network node 300 desires to communicate.

The software portion of the universal sensor interfaces 330-n can include a protocol that allows sensor network node 300 to communicate with a bridge unit. In one example protocol, controller 310 can be configured to poll the various universal sensor interfaces 330-n to determine whether any bridge units are connected. As part of this protocol, controller 310 can first request a sensor ID from a bridge unit. If the response read is "0", then controller 310 would know that no bridge unit is connected to that universal sensor interface 330-n. If, on the other hand, the response read is not "0", then controller 310 would ask for the number of data values that have to be retrieved and the number of bits on which the data values are coded. In one example, the higher order 8-bits of a 16-bit communication between controller 310 and a bridge unit identifies the number of data values, while the lower order 8-bits of the 16-bit communication identifies the number of bits used to code each data value. Based on the number of data values to be retrieved, controller 310 would then collect that number of data values.

Figure 4:
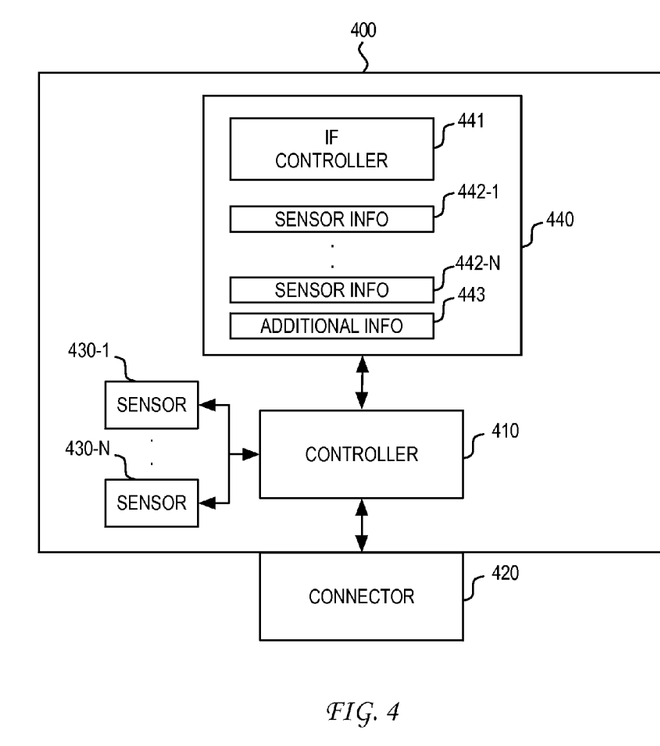
FIG. 4 illustrates an example embodiment of a bridge unit.

FIG. 4 illustrates an example embodiment of a bridge unit configured for attachment to a sensor network node, an example of which was described with reference to FIG. 3. As illustrated, bridge unit 400 includes controller 410, which communicates over a universal sensor interface with a supporting sensor network node. In one embodiment, bridge unit 400 supports the universal sensor interface with a connector 420 configured for pluggable, removable insertion into a corresponding connector interface exposed by the supporting sensor network node. In another embodiment, the bridge unit can be coupled to the connector interface exposed by the supporting sensor network node via a connector attached to a cable.

Bridge unit 400 can support a plurality of sensors 430-n such as a temperature sensor, a humidity sensor, an air quality (e.g., $CO_2$) sensor, a light sensor, a sound sensor, or any other sensor that can be incorporated in bridge unit 400. Additionally, one or more sensors 430-n can generate sensor data based on inputs received from an external sensor element. For example, a pulse sensor in bridge unit 400 can be configured to receive pulse signal inputs from an external sensor element and can translate the pulse signal inputs into sensor data. As would be appreciated, one or more of sensors 430-n can be configured to operate on any type of input signals generated by an external sensor element. In various examples, the signal inputs can be generated by external sensor elements that support an occupancy sensor application, a radiation sensor application, a contact sensor application, a flow sensor application, a resource consumption application, a credential sensor application, or any other type of sensor application configured to measure a characteristic associated with a physical environment of a part of the monitored location.

As noted, support of one or more sensors by a bridge unit can be enabled via an interface of the bridge unit with an external controller. Referring back to the example illustration of FIG. 2, this scenario is illustrated by bridge unit 250 interfacing with controller 260, which supports one or more sensors 270. In one embodiment, the interface between bridge unit 250 and controller 260 is an interface based on an industry-defined protocol. For example, the interface can be based on Modbus, BACnet, LonWorks, or any other industry-defined interface specification.

With reference to the example embodiment of FIG. 4, bridge unit 400 can include interface section 440 to support the interface with an external controller. Interface section 440 can include an interface controller 441 that is configured to communicate with a corresponding external controller that provides support for one or more sensors. For example, interface section 440 can be configured to communicate with an energy-monitoring meter having voltage and current sensors that can be used to determine energy-related data such as kWh, kW peak demand, power factor per phase, amps per phase and volts per phase. In this example, interface controller 441 can read data from the energy-monitoring meter using the industry-defined interface. In one scenario, the read data can include a plurality of sensor information 442-n as well as one or more elements of additional information 443. As would be appreciated, the one or more elements of additional information 443 can relate to the interface, one or more sensors, the meter, the application, or any information relevant to the resulting connection of the meter to the bridge unit.

Figure 5:
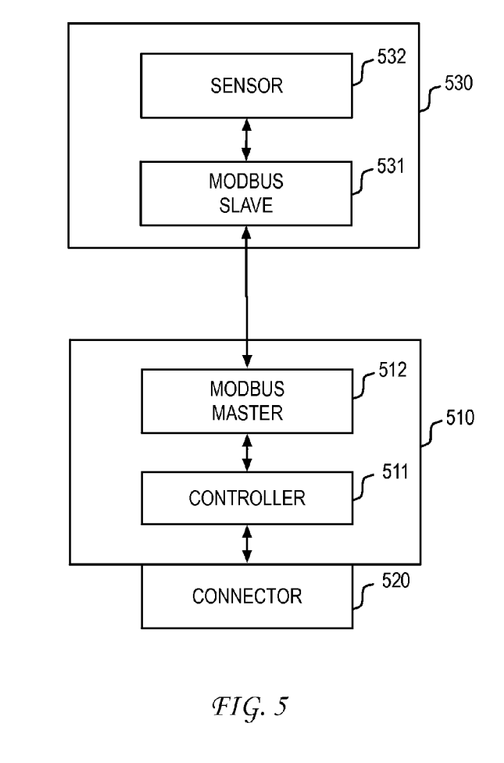
FIG. 5 illustrates an example embodiment of a bridge unit interfacing with an external controller.

FIG. 5 illustrates an example embodiment of a bridge unit interfacing with an external controller that supports one or more sensors. In this embodiment, assume that the interface between the bridge unit and the external controller is a Modbus interface. As would be appreciated, BACnet, LonWorks, or any other industry-defined interface can also be used between the bridge unit and the external controller.

In general, the Modbus protocol defines a message structure and format used in communication transactions. Modbus devices can communicate using a master-slave method, in which only the master device can initiate a communications transaction with a slave device. A Modbus slave device can hold accessible data in addressable registers. A Modbus slave can contain one or more of four groups of data, including Coil status, Input status, Input registers and Holding registers. A Coil status is a single-bit flag that can represent the status of a digital output of the slave, an Input status is a single-bit flag that can represent the status of a digital input of the slave, an Input register is a 16-bit register that can store data collected by the slave device, and a Holding register is a 16-bit register that can store general-purpose data in the slave device. The various status and registers can be accessed through a specification of a data address (and range) of interest. A Modbus message can include a device address, function code (e.g., read Holding register), and the data address or range of addresses.

As illustrated, bridge unit 510 includes controller 511, an example of which was described with reference to controller 410 in FIG. 4, and Modbus controller 512 operating in a master mode. Modbus controller 512 can be configured to interface with Modbus controller 531 operating in a slave mode in monitoring device 530. As illustrated, monitoring device 530 can include one or more sensors 532. Here, it should be noted that the interface can be a serial interface or can be an interface enabled by a TCP/IP network.

In communicating with Modbus controller 531 to collect data based on measurements by one or more sensors 532, Modbus controller 512 in bridge unit 510 can be configured based on configuration settings stored in a database of the operation center. In one embodiment, the configuration settings for Modbus controller 512 in bridge unit 510 can be stored in accordance with an identifier based on a gateway identifier, a sensor network node identifier, and a port identifier, wherein the port identifier references a particular connector interface of the sensor network node to which bridge unit 510 is connected. In one example, the configuration settings can include the baud rate, the endianness, a device address of the slave device, function codes (e.g., read/write), and the particular data addresses that are relevant to the function codes. In one embodiment, the configuration settings can be generated based on inputs provided by a user through a user interface supported by the operation center.

Based on the configuration settings stored in the database, the operation center can generate configuration setup packets for transmission to the supporting sensor network node via the gateway. The configuration setup packets can be used by the supporting sensor network node to configure the operation of the Modbus controller in the bridge unit attached to the particular port of the supporting sensor network node. For example, the configuration setup packets can be used to configure the Modbus controller in the bridge unit to read data from a particular address or range of addresses. In one embodiment, the rate (e.g., every X seconds) at which the Modbus controller would transmit the read requests can be controlled by the data collection interval established for the supporting sensor network node. As has been described, the configuration settings can be used to effect a remote configuration of the interface between Modbus controller 512 in bridge unit 510 and Modbus controller 531 in monitoring device 530.

In one embodiment, the operation center can also generate action packets that enable one-off requests by a Modbus controller in a bridge unit. For example, the one-off request can relate to a read of a particular address or range of addresses to effect some form of verification, or can relate to a write of a particular address or range of addresses to effect some form of control. In one embodiment, the event-based action packet can be initiated by user interaction with a user interface supported by the operation center. In another embodiment, the event-based action packet can be initiated in response to analytics performed on data collected by the operation center from one or more sensor network nodes. For example, the action packet initiated based on analytics can be used to effect a response action at a monitored location. As would be appreciated, the event-based action packet can be initiated in response to any event and can control a Modbus controller in any bridge unit to transmit a particular request over the Modbus interface.

Figure 6:
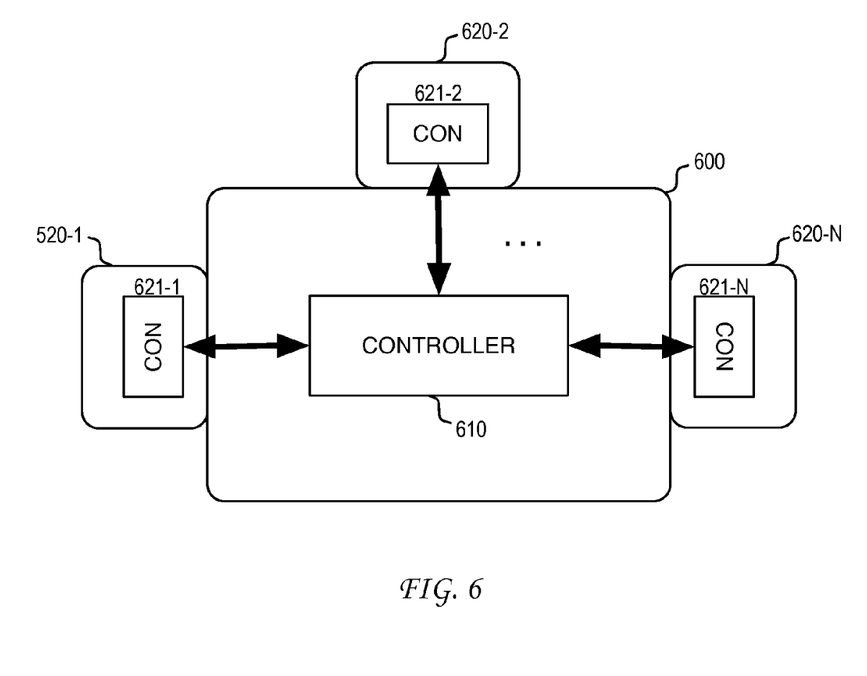
FIG. 6 illustrates an example embodiment of a sensor network node that is physically attached to a set of bridge units.

As has been described, a bridge unit can collect sensor-related data from a plurality of sensors in a variety of ways. Regardless of the mechanism of collection of data from supported sensors, the bridge unit can provide the collected data to a sensor network node via a universal interface. FIG. 6 illustrates an example data flow between a sensor network node and a plurality of bridge units. As illustrated, sensor network node 600 interfaces with a plurality of bridge units, including bridge unit 620-1, bridge unit 620-2, . . . , and bridge unit 620-N. Connectors of bridge unit 620-1, bridge unit 620-2, . . . , and bridge unit 620-N are each physically attached to separate connector interfaces exposed by the housing of sensor network node 600.

The attachment of bridge unit 620-1 to sensor network node 600 enables communication of data between controller 621-1 and controller 610, the attachment of bridge unit 620-2 to sensor network node 600 enables communication of data between controller 621-2 and controller 610, . . . , and the attachment of bridge unit 620-N to wireless node 600 enables communication of data between controller 621-N and controller 610. By this attachment, each of bridge units 620-1, 620-2, . . . , and 620-N can be coupled to sensor network node 600 via a universal sensor interface having the connectivity characteristics described above.

Figure 7:
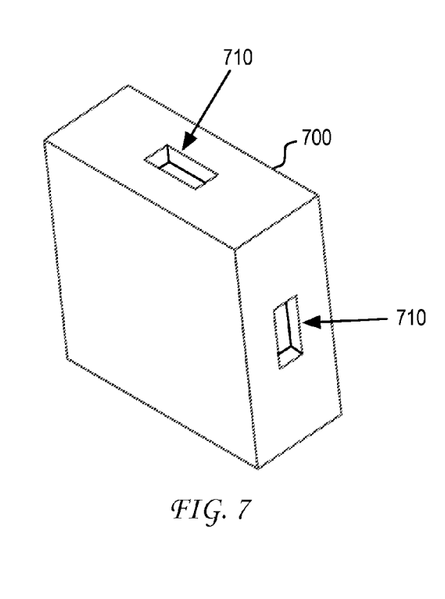
FIG. 7 illustrates an example embodiment of a housing of a sensor network node that exposes connector interfaces.

The plug-and-play nature of the connection of bridge units to supporting sensor network nodes facilitates a modular framework for collection of sensor data at a monitored location. FIG. 7 illustrates an example embodiment of a housing of a sensor network node such as the example illustration of sensor network node 300 in FIG. 3. As illustrated, sensor network node 700 can have a housing configured to expose a plurality of connector interfaces 710. Each of the plurality of connector interfaces 710 can support the physical attachment of a single bridge unit. In the example illustration, each side of the housing of node 700 exposes a single connector interface 710. In the present disclosure, it is recognized that the housing of the node can be substantially larger than the housing of the bridge unit. This can result, for example, because the node can be designed with additional components such as an internal power source (e.g., battery) that can involve additional volume requirements as compared to the bridge units. It is therefore recognized that one embodiment of a sensor network node can have multiple bridge units physically attached to a single side of the sensor network node.

Figure 8:
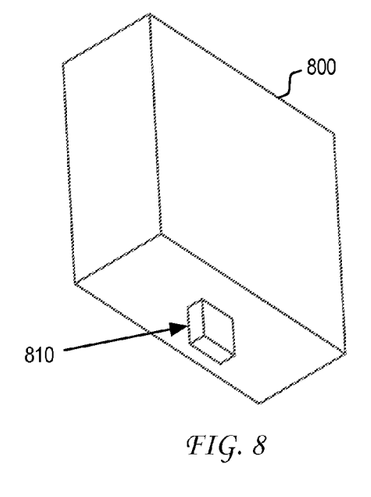
FIG. 8 illustrates an example embodiment of a housing of a bridge unit.

FIG. 8 illustrates an example embodiment of a housing of a bridge unit such as the example illustration of bridge unit 400 in FIG. 4. As illustrated, bridge unit 800 can have a housing configured to expose a connector 810. Connector 810 can be configured for pluggable, removable insertion into a corresponding connector interface 710 exposed by the housing of sensor network node 700. The connection of bridge unit 800 to sensor network node 700 via the insertion of connector 810 into connector interface 710 produces a true plug-and-play framework for the deployment of sensors at a monitored location.

Whether from internal sensors or from sensors supported by one or more bridge units attached to a sensor network node, data based on sensor measurements can be collected by a sensor network node and transmitted to an operation center for storage in a database. As illustrated in FIG. 2, sensor network node 222-1 can collect data based on measurements by sensors integrated with sensor network node 222-1, can collect data based on measurements by sensors supported by bridge unit 240, and can collect data based on measurements by sensors supported by bridge unit 250. The collected data based on measurements by these various sensors can be transmitted to operation center 230 via gateway 221. Operation center 230 can then store the collected data in a database.

The data collected by sensor network node 222-1 represents data collected outside of domain 210 in which legacy control system 211 operates. It is a feature of the present disclosure that operation center 230 can process the collected data to produce customized information for presentation to a known interface supported by legacy control system 211. In general, the customized information can be designed to produce actionable information for use by legacy control system 211.

In one example, the customized information can represent sensor measurement data that has been conditioned for use by legacy control system 211. In one scenario, operation center 230 can smooth a stream of sensor data by presenting a moving average of sensor data. The smoothed or otherwise conditioned data can prevent legacy control system 211 from performing unwarranted response actions upon the occurrence of spurious sensor data readings.

In another example, operation center 230 can be configured to transform multiple sensor data values into a transformed data value. In one scenario, operation center 230 can generate a power measurement data value based on a voltage measurement data value and a current measurement data value. Here, it should be noted that operation center 230 can be configured to perform complex conversion functions that may not be supported by a monitoring device that performed the sensor measurements.

In yet another example, operation center 230 can be configured to transform multiple sensor data values into information reflective of custom analytics. In a simple scenario, operation center 230 can be configured to analyze collected data relative to a threshold value. This alert function can be applied to a single stream of collected data. In a more complex scenario, an alert function can be defined that analyzes a composite of multiple data values. For example, the alert function can analyze a moving average, a rate of change, or any factor inclusive of multiple data values to determine whether an alert should be triggered. In one scenario, the custom analytics can be configured to monitor the operation of equipment at a monitored location to determine whether a maintenance action should be scheduled. As would be appreciated, these examples are not intended to be limiting of the scope of the present disclosure. In general, the particular form of the alert function would be implementation dependent.

Operation center 230 can be configured to process collected data to produce any form or type of information needed by legacy control system 211. Thus, the particular processing performed by operation center 230 would be dependent on the needs and capabilities of legacy control system 211 and the sensor application implemented.

The processing of collected data can produce customized information for presentation to legacy control system 211. As illustrated, the customized information can be transmitted by operation center 230 to gateway 221. Gateway 221 can forward the customized information to sensor network node 222-2 via the sensor network (e.g., wireless mesh network). Sensor network node 222-2 can be configured to interface with legacy control system 211 via bridge unit 280 to present the customized information to legacy control system 211.

Figure 9:
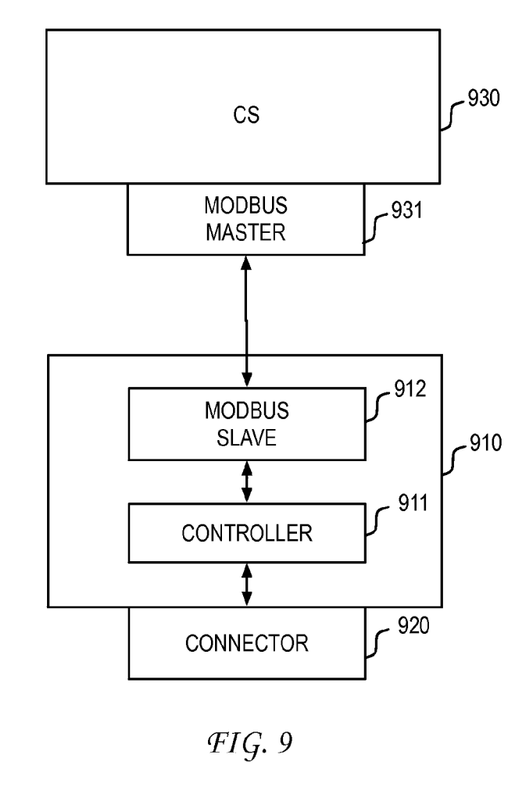
FIG. 9 illustrates an example embodiment of a bridge unit interfacing with a building control system.

FIG. 9 illustrates an example embodiment of a bridge unit that can interface with a building control system 930. In this embodiment, assume that the interface between the bridge unit and the building control system is a Modbus interface. As would be appreciated, BACnet, LonWorks, or any other industry-defined interface can also be used between the bridge unit and the building control system.

As illustrated, bridge unit 910 includes controller 911, an example of which was described with reference to controller 410 in FIG. 4, and Modbus controller 912 operating in a slave mode. Modbus controller 912 in bridge unit 910 can be configured to interface with Modbus controller 931 operating in a master mode. In this arrangement, Modbus controller 912 can be configured to respond to messages from Modbus controller 931. For example, Modbus controller 931 can transmit a Modbus request message that includes a device address, function code, and the data address or range of addresses. This Modbus message can be used to collect information from bridge unit 910 (e.g., sensor information and/or additional information) in a manner similar to the collection of information from a monitoring device. As compared to the interface relationship illustrated in FIG. 5, the role of the bridge unit has switched from a master mode to a slave mode. Again, it should be noted that the interface can be a direct serial interface or can be an interface enabled by a TCP/IP network.

From one perspective, bridge unit 910 can function as a type of proxy for an actual monitoring device. While bridge unit 910 can stand in the place of a monitoring device in presenting information based on measurements by a monitoring device, the back-end functions of the operation center enables bridge unit 910 to present customized information, not just the data collected and/or generated by the monitoring device.

In communicating with Modbus controller 931, Modbus controller 912 can be configured based on configuration settings stored in a database of the operation center. In one embodiment, the configuration settings for Modbus controller 912 in bridge unit 910 can be stored in accordance with an identifier based on a gateway identifier, a sensor network node identifier, and a port identifier, wherein the port identifier references a particular connector interface of the sensor network node to which bridge unit 910 is connected. In one example, the configuration settings can specify the device and data addresses needed for Modbus controller 912 to respond to requests from Modbus controller 931. For example, the configuration settings can specify the data addresses to be associated with sensor information and/or additional information to be provided to Modbus controller 931. Based on this association, Modbus controller 912 would know which sensor information and/or additional information should be sent to Modbus controller 931 in response to a request. In one embodiment, the configuration settings can be generated based on inputs provided by a user through a user interface supported by the operation center.

Based on the configuration settings stored in the database, the operation center can generate configuration setup packets for transmission to the supporting sensor network node via the gateway. The configuration setup packets can then be used by the sensor network node to configure the operation of the Modbus controller in the bridge unit attached to the particular port of the sensor network node. The configuration settings can therefore be used to effect a remote configuration of the interface between Modbus controller 912 in bridge unit 910 and Modbus controller 931.

Figure 10:
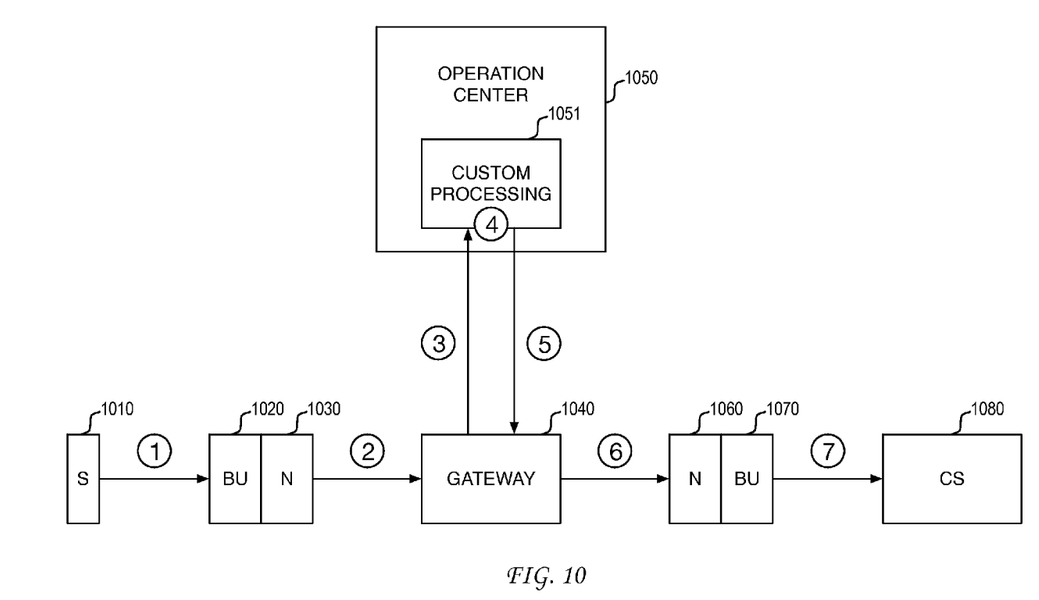
FIG. 10 illustrates a data flow of an augmented control system domain.

Having described a framework for augmenting a domain of a legacy control system, a description of a data flow in an augmented control system domain is now provided with reference to FIG. 10. In the example illustration of FIG. 10, data can be generated based on sensor measurements performed by sensor 1010. The generated data can then be provided to bridge unit 1020. The provision of data to bridge unit 1020 is illustrated as data flow "1". In one example, the provision of data from sensor 1010 to bridge unit 1020 can be performed via intra-device communication where sensor 1010 is integrated with bridge unit 1020. In another example, the provision of data from sensor 1010 to bridge unit 1020 can be performed via an external interface based on an industry-defined protocol. In one scenario, bridge unit 1020 includes a Modbus controller operating in a master mode that retrieves data from a monitoring device that includes a Modbus controller operating in a slave mode.

Bridge unit 1020 can leverage a sensor network node communication infrastructure formed by a plurality of sensor network nodes to communicate the collected data to gateway 1040. Entry into the sensor network node communication infrastructure is through sensor network node 1030. In one embodiment, bridge unit 1020 is attached to sensor network node 1030 via a plug-and-play universal sensor interface. The communication through the sensor network node communication infrastructure is illustrated as data flow "2". The sensor network node infrastructure can be based on wired and/or wireless communication, and can include communication through one or more intervening nodes between sensor network node 1030 and gateway 1040. In one example, the data is communicated through a wireless mesh network formed by a plurality of wireless sensor network nodes.

Gateway 1040 can transmit the data received from the sensor network node communication infrastructure to operation center 1050 via a network connection. This communication is illustrated as data flow "3". Operation center 1050 can be located external to the monitored location. In various embodiments, the network connection can be based on wired and/or wireless communications.

Having been transported offsite from the monitored location, the collected data can now be processed for presentation to control system 1080. In one embodiment, the processing is performed by custom processing element 1051, which can be enabled by one or more servers at operation center 1050 under the control of configuration settings established by a user. In one embodiment, the processing can include one or more conversion functions defined by the configuration settings. These one or more conversion functions may not be supported by a monitoring device in the building control system domain. The production, by custom processing element 1051, of sensor information from data based on measurements by sensor 1010 is illustrated as data flow "4". The custom-processed sensor information can now be returned to the monitored location for presentation to control system 1080. Operation center 1050 can be configured to transmit the custom-processed sensor information back to gateway 1040 via the network connection. This communication is illustrated as data flow "5".

Gateway 1040 would then transmit the custom-processed sensor information to bridge unit 1070 via the sensor network node communication infrastructure formed by the plurality of sensor network nodes. This communication through the sensor network node communication infrastructure is illustrated as data flow "6". Again, the communication through the sensor network node communication infrastructure can include communication through one or more intervening nodes between sensor network node gateway 1040 and sensor network node 1060.

The custom-processed sensor information can exit from the sensor network node communication infrastructure through sensor network node 1060 and be passed to bridge unit 1070. In one embodiment, bridge unit 1070 is attached to sensor network node 1070 via a plug-and-play universal sensor interface.

Bridge unit 1070 can now present the custom-processed sensor information to building control system 1080. This presentation is illustrated as data flow "7". In one embodiment, the presentation of custom-processed sensor information from bridge unit 1070 to building control system 1080 can be performed via an external interface based on an industry-defined protocol. In one scenario, bridge unit 1070 includes a Modbus controller operating in a slave mode that is responsive to requests for the custom-processed sensor information from a Modbus controller operating in a master mode.

As this example data flow illustrates, custom-processed sensor information can be generated from data based on measurements taken by sensors outside of a control system domain. The custom-processed sensor information can then be presented to the control system through a known interface supported by the control system. The control system domain is thereby augmented with sensor information that was not previously available to the control system.

In general, a flexible sensor network node infrastructure such as that described with reference to FIG. 2 can be established outside of an existing control system domain. This sensor network node infrastructure may or may not leverage custom processing of collected data using an operation center outside of the control system domain. In one example, the control system domain can be augmented with sensor data produced by sensors not previously supported by the legacy control system. In this scenario, the provision of new sensor data through a known interface supported by the control system would be advantageous.

With reference to FIG. 2, additional sensor data that augments the legacy control system domain can be generated by sensors supported by bridge unit 280, can be generated by sensors supported by sensor network node 222-2, can be generated by sensors supported by another bridge unit attached to sensor network node 222-2, and can be generated by sensors supported by another sensor network node 222-n, whether or not the sensor data passed through operation center 230 for custom processing. This can be the case, for example, where the sensor network node communication infrastructure has a reach that extends beyond the communication infrastructure that supports legacy control system domain 210.

The augmentation of the legacy control system domain has many benefits. For example, expanding the sensor information considered by the legacy control system domain can improve reporting, information management and decision-making, can increase operational savings through more efficient resource deployment, can promote more robust energy efficient decisions, and can provide a flexible mechanism to scale the control system platform.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A system, comprising:
   a first wireless node in a building, the first wireless node including a first wireless transceiver, the first wireless node configured to retrieve sensor data based on measurements by one or more sensors in the building;
   a gateway device in the building, the gateway device including a wide area network connection with an operations center located external to the building, the gateway device configured to receive the sensor data from the first wireless node via wireless communication, transmit the sensor data to the operation center via the wide area network connection, and receive sensor information based on the sensor data from the operation center via the wide area network connection;
   a second wireless node in the building, the second wireless node including a second wireless transceiver that communicates with the gateway device via wireless communication, the second wireless node configured to receive the sensor information from the gateway device, the second wireless node supporting a wired communication interface having a serial data connection and a serial clock connection;
   a slave bridge unit that is connected to the second wireless node via the wired communication interface, the slave bridge unit receiving the sensor information from the second wireless node using the serial data connection and the serial clock connection, the slave bridge unit including a slave controller configured to respond to requests for the sensor information received via an external wired interface of the slave bridge unit; and
   a building control system including a master control unit that is connected to the slave bridge unit via the external wired interface, the master control unit including a master controller that is configured to transmit a request for the sensor information to the slave controller in the slave bridge unit via the external wired interface, and to receive, in response to the request, the requested sensor information via the external wired interface.

2. The system of claim 1, wherein the sensor information is information related to power consumption.

3. The system of claim 1, wherein the sensor information is temperature information.

4. The system of claim 1, wherein the sensor information is air quality information.

5. The system of claim 1, wherein the sensor information is alert information.

6. A method, comprising:
   receiving, by a gateway device in a building via wireless communication, sensor data based on measurements by one or more sensors supported by a first wireless network node in the building;
   transmitting, by the gateway device, the sensor data to an operations center at a location remote from the building, the gateway device communicating with the operations center via a wide area network;
   receiving, by the gateway device from the operation center, sensor information based on the sensor data;
   transmitting, by the gateway device via wireless communication, the sensor information received from the operation center to a second wireless network node in the building, the second wireless network node connected via an external wired interface to a master controller in the building, the second wireless network node including a slave controller configured to respond to a request for the sensor information received from the gateway device;
   receiving, by the second wireless network node via the external wired interface, a sensor information request from the master controller; and
   transmitting, by the second sensor network node in response to the sensor information request, the sensor information received from the operation center to the master controller for delivery as an input to a building control system in the building.

7. The method of claim 6, wherein the master controller is a Modbus controller.

8. The method of claim 6, wherein the master controller is a BACnet controller.

9. The method of claim 6, wherein the master controller is a LonWorks controller.

10. The method of claim 6, wherein the sensor information is information related to one of power consumption, temperature and air quality.

11. The method of claim 6, wherein the sensor information is alert information produced based on an analysis of the sensor data.

12. A device, comprising:
    a wireless node in a building, the wireless node including a wireless transceiver that communicates with a gateway device in the building via wireless communication, the gateway device having a wide area network connection that enables the gateway device to receive configuration setup information from an operation center at a location remote from the building, the wireless node having a wired communication interface and configured to receive the configuration setup information that is forwarded by the gateway device via wireless communication; and
    a bridge unit that is connected to the wireless node via the wired communication interface, the bridge unit including a first controller configured to connect to a second controller in a sensor unit external to the device via a Modbus interface, the device using the configuration setup information to configure master/slave communication between the first controller and the second controller via the Modbus interface, the bridge unit retrieving a sensor data value from the sensor unit via the Modbus interface and transmitting the sensor data value to the wireless node, wherein the wireless node transmits the sensor data value to the gateway device via wireless communication for delivery to the operation center at the location remote from the building.

13. The device of claim 12, wherein the configuration setup information identifies a register address of the sensor unit.

14. The device of claim 12, wherein the sensor data value is information related to power consumption.

15. The device of claim 12, wherein the sensor data value is temperature information.

16. The device of claim 12, wherein the sensor data value is air quality information.

17. The device of claim 12, wherein the sensor data value is alert information.

18. The device of claim 12, wherein the wireless node receives a packet from the gateway device and configures the first controller to transmit a request to the second controller to write data to an address, wherein the request is based on information contained in the received packet.

19. The device of claim 18, wherein the configuration setup information is used to configure the first controller to transmit periodic write requests.

20. The device of claim 12, wherein the configuration setup information is used to configure the first controller to transmit periodic read requests.

* * * * *